United States Patent [19]

Stevenson

[11] 3,971,196

[45] July 27, 1976

[54] POWER MOWER

[76] Inventor: James S. Stevenson, 4230 St. Andrews Road, Oakland, Calif. 94605

[22] Filed: Dec. 16, 1974

[21] Appl. No.: 533,008

[52] U.S. Cl. .................................. 56/17.1; 56/17.4; 56/255

[51] Int. Cl.² ........................................ A01D 35/262

[58] Field of Search .................. 56/17.1, 17.2, 17.4, 56/17.5, 255, 14.7, 14.9, DIG. 18, 249, 503

[56] References Cited

UNITED STATES PATENTS

| | | | |
|---|---|---|---|
| 2,485,984 | 10/1949 | Newman | 56/17.1 |
| 2,552,951 | 5/1951 | Freeman | 56/17.2 |
| 2,578,880 | 12/1951 | Doyle | 56/255 X |
| 2,794,308 | 6/1957 | Cavanaugh | 56/249 X |
| 2,871,644 | 2/1959 | Mott | 56/249 X |
| 3,077,718 | 2/1963 | McLaughlin | 56/17.1 |
| 3,369,350 | 2/1968 | Rogers et al. | 56/503 X |
| 3,727,386 | 4/1973 | Jespersen et al. | 56/17.4 X |
| 3,799,579 | 3/1974 | Dahl | 56/17.4 X |

*Primary Examiner*—J.N. Eskovitz

[57] ABSTRACT

A power mower in which the mower is adjustably suspended as to elevation between a pair of large diameter wheels of the bicycle type, whereby the power mower is not only of light weight but is easily maneuverable, capable of a wide range of height adjustments, and capable of not only trimming ground cover but also cutting weeds which may be growing through ground cover.

9 Claims, 12 Drawing Figures

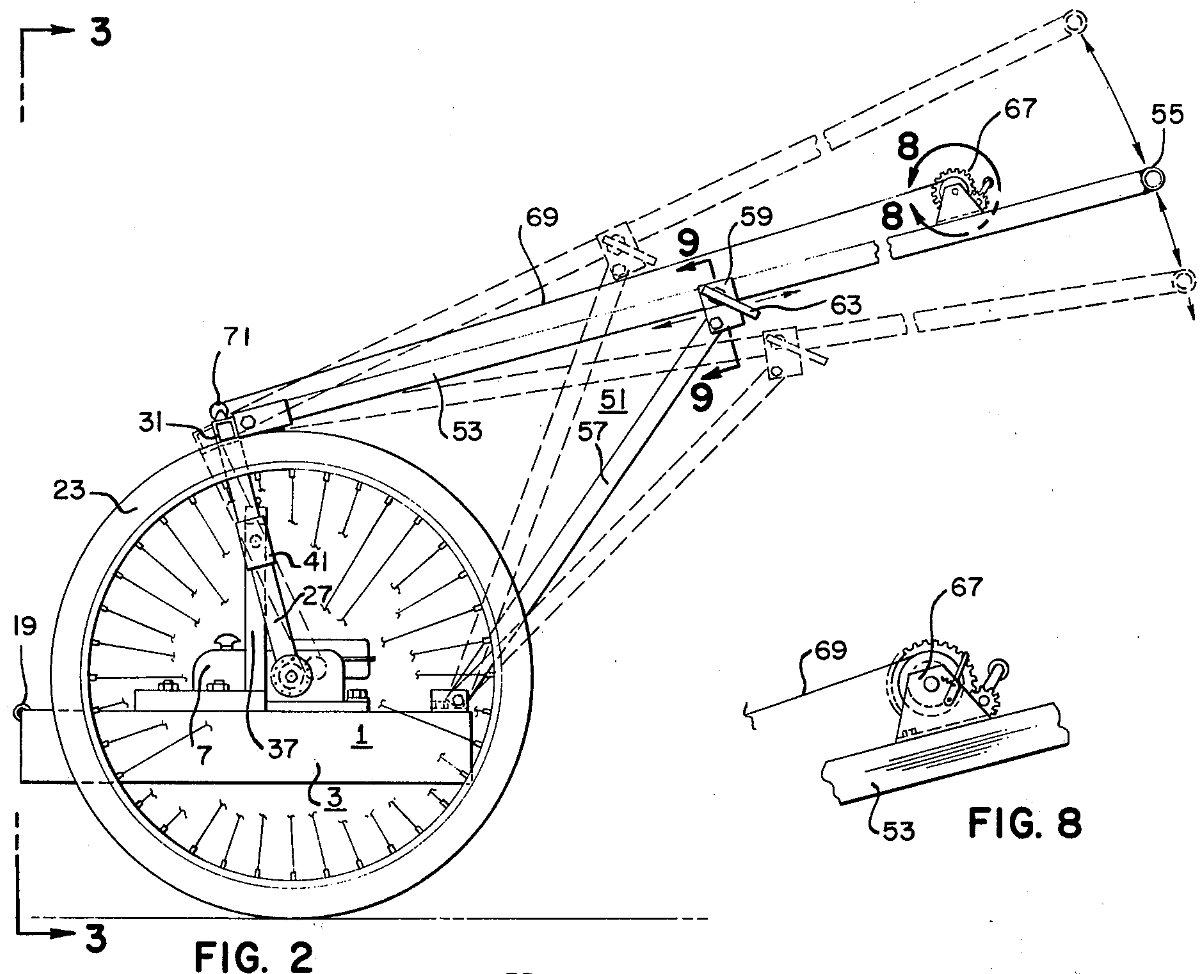
FIG. 2
FIG. 8
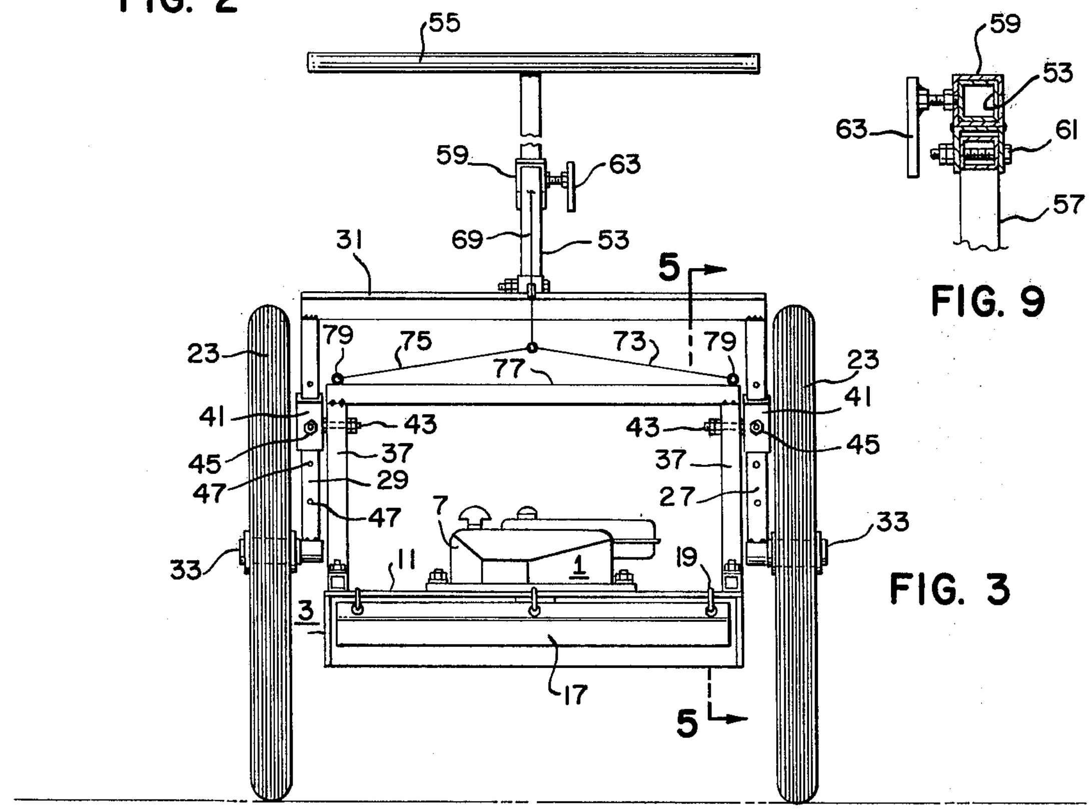
FIG. 9
FIG. 3

POWER MOWER

THE INVENTION

The invention relates to the cutting of vegetation, weeds, etc., and more particularly to a power mower for performing such tasks.

Conventional power mowers, as we know them, usually involve a mower unit supported close to ground on four small wheels, one at each corner. Elevation adjustments are accomplished at each wheel, usually by removing each such wheel and assembling it at a different opening in the housing or shroud usually provided for the cutting blade, and thus, such elevation adjustments are not only time consuming to make, but are limited in scope. And the fact that the small wheels conventionally employed, result in close-to-ground support for the mower unit, makes it difficult to push or drive the mower through tall grass, weeds, etc., and renders the mower useless for trimming ground cover or cutting weeds growing among ground cover.

Among the objects of the invention are:

1. To provide a novel and improved power mower;
2. To provide a novel and improved power mower having a wide range of elevational adjustments;
3. To provide a novel and improved power mower which can be readily maneuvered over heavy growth;
4. To provide a novel and improved power mower which can be used in trimming ground cover or cutting weeds growing through such ground cover;
5. To provide a novel and improved power mower for heavy duty use, yet which is of extremely light weight;
6. To provide a novel and improved power mower in which shock impact is not transmitted to vital and important mower unit supports;
7. To provide a novel and improved power mower in which elevational adjustments can be made by the operator in a simple and expeditious matter.

Additional objects of the invention will be brought out in the following description of the preferred embodiment of the same taken in conjunction with the accompanying drawings wherein, FIG. 1 is a three dimensional view of the power mower of the present invention in its preferred form;

FIG. 2 is a side view in elevation of the power mower of FIG. 1, and depicting a manner of adjusting the handle to the convenience of an operator;

FIG. 3 is a front view in elevation of the power mower of FIG. 1;

FIG. 8 is a detail of a winch depicted in the circle 8—8 of FIG. 2;

FIG. 9 is a view taken in the plane 9—9 of FIG. 2;

Figure 10:
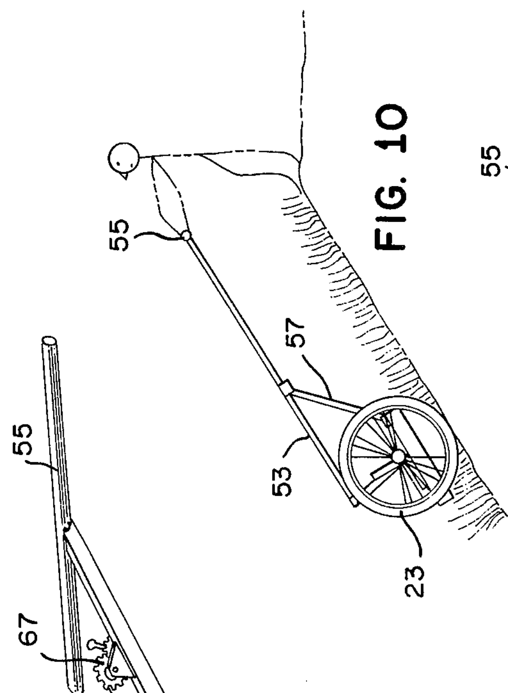
FIG. 10 is a sketch depicting the manner of use of the power mower of the present invention on a steep slope.
Figure 11:
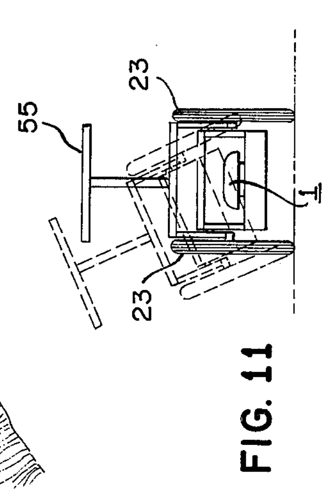
FIG. 11 is a sketch depicting the ease with which the power may be tilted while in use.
Figure 12:
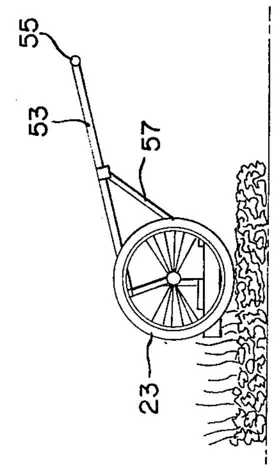
FIG. 12 is a sketch depicting the manner in which the power can operate on ground cover, either for trimming the same or cutting weeds growing through it.
Figure 1:
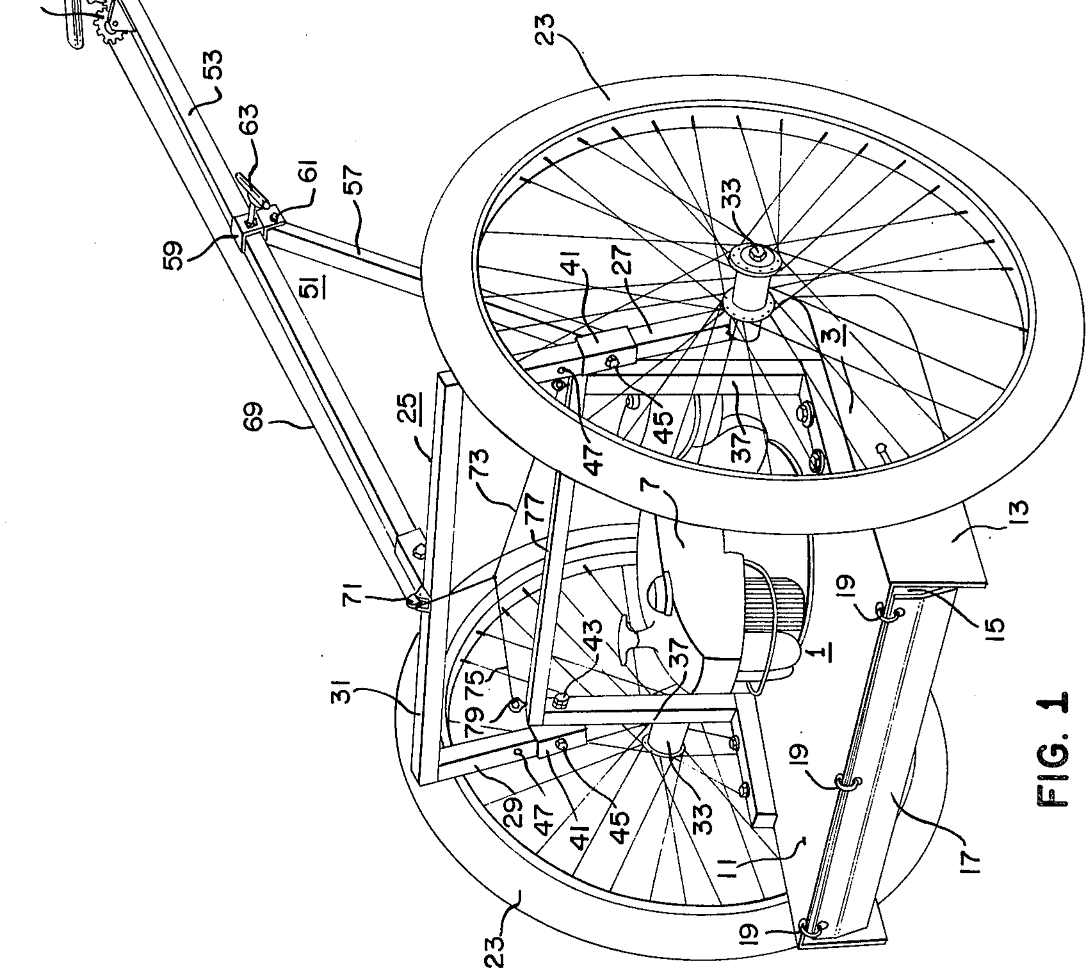
Figure 4:
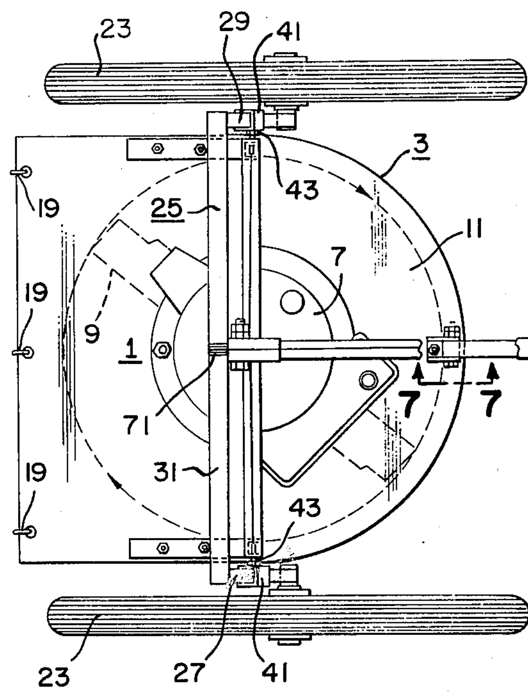
FIG. 4 is a top plan view of the power mower of FIG. 1.
Figure 7:
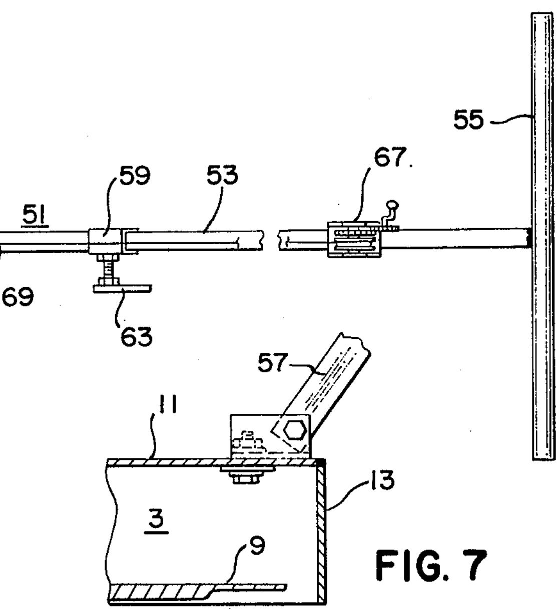
FIG. 7 is a view taken in the plane 7—7 of FIG. 4.
Figure 5:
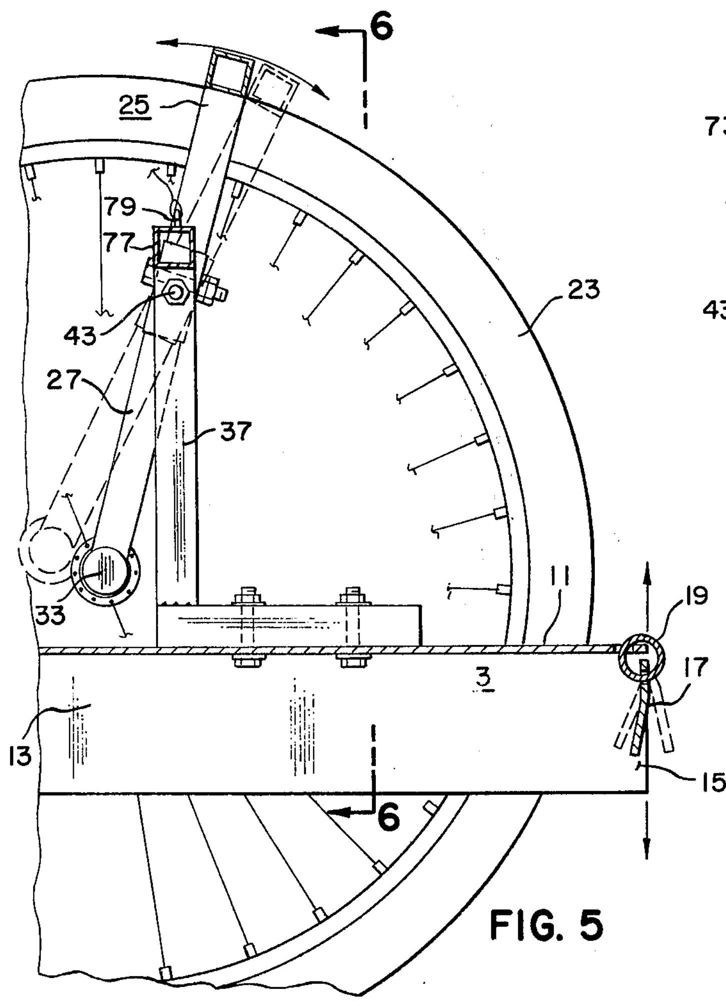
FIG. 5 is a fragmentary view depicting, in detail, elevational adjustment of the mower unit.
Figure 6:
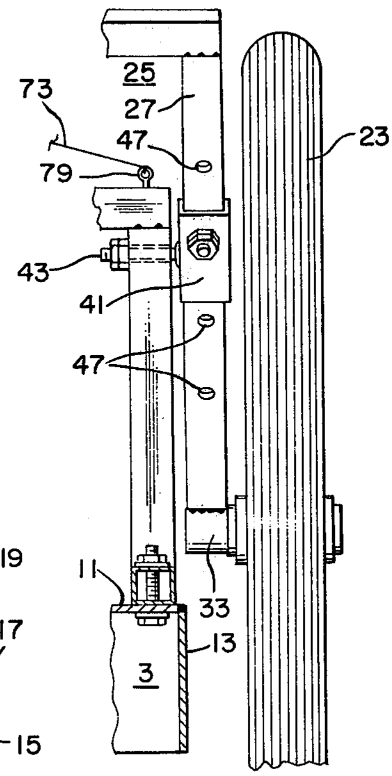
FIG. 6 is a view taken in the plane 6—6 of FIG. 5.

In general, the invention involves adjustably suspending as to elevation, a mower unit between a pair of large diameter wheels, such as bicycle wheels, and providing the assembly with a long handle of the T-type, the entire mower being of light weight and very maneuverable as well as capable of use in trimming ground cover or cutting weeds growing through such ground cover.

For details of the invention in its preferred form, reference will be had to the accompanying drawings wherein a mower unit 1 may involve a blade housing or shroud 3 to which is affixed a power unit 7 for drive coupling to a cutting blade 9 within the blade housing. The blade housing may include a platform 11 to which the power unit 7 may be bolted, the platform having a fixed apron 13 depending therefrom along the rear and side portions of the periphery, leaving an open space 15 facing to the front of the power mower and providing a front opening to the housing interior, and this open space is spanned by a plate 17, preferably of airfoil design, hingedly suspended from the edge of the platform preferably by hog rings 19, whereby to facilitate access of tall weeds into the housing, and in the absence of such tall weeds, such airfoil functions to deflect stones or other debris thrown in that direction by the whirling blade, it being understood that such tall weeds, while entering the housing, will in and of themselves act as a protection against such flying debris.

The mobile support for the mower unit involves in addition to a pair of large diameter wheels 23 which are spaced apart sufficiently to receive the mower unit between them, a bridge 25 connecting such wheels and involving a pair of upright members 27, 29 connected at their upper ends by a cross member 31, with each upright member at its lower end, being provided with a stub shaft or axle 33 on which to rotatably mount one of the wheels.

These upright members constitute means from which to adjustably suspend the mower unit, and accordingly, as part of the suspension means, a bracket 37 is affixed to the platform adjacent each of the upright members of the bridge, and adjacent its upper end, being slidably and pivotally coupled to its proximate upright by coupling means involving a sleeve 41 surrounding the upright member in slidable relationship therewith and provided with a laterally and inwardly extending pin 43 passing through the upper end of the associated bracket and functioning as a pivotal support therefor. The sleeve is provided with a set screw 45 to lock it at any adjusted position along its upright member, or the upright member may be provided with a plurality of small holes 47 in which to receive the set screw, whereby a more positive locking of the adjustment may be realized.

It will be appreciated, that, as thus far described, the power unit, being pivotally suspended from the bridge and being balanced properly, it will tend to seek a horizontal position regardless of the elevational adjustments thereof.

However, provision is made in conjunction with a handle assembly 51 for the power mower, to alter the attitude of the mower unit, whereby it may be shifted from its horizontal position, to any of various angular positions for use in attacking unusually high weed growth.

The handle assembly is of the T-type involving a relatively long shaft 53 symetrically and preferably removably coupled to the cross member 31 of the bridge, and at its free end, being provided with a cross bar handle 55. A brace arm 57 hingedly connected at one end to the rear end of the shroud platform, has its other end slidably coupled to the handle shaft 64, such coupling involving a sleeve or shackle 59 slidably installed about the shaft with the brace arm 57 pivotally secured thereto by a pin 61. A locking key 63 threadable through the sleeve or shackle into engagement with the handle shaft will secure the coupling at any point within its range or adjustment along the shaft. Various functions may be attributable to this coupling.

For one thing, it will permit adjustment of the position of the crossbar handle to the convenience of an operator, for, as such coupling is shifted in the direction of the crossbar handle, the elevation of the handle will drop. Conversely, such coupling, when shifted in reverse, will cause a rise of the handle. Once such elevation adjustment of the handle is established to the convenience of the operator, then by holding it at such elevation, the coupling may then be adjusted so as to change the attitude of the mower unit to any position within its range of adjustment.

With the brace bar in its locked position, any shock impact against the power mower, such as may occur when driving it into heavy brush or high weeds, which impact would otherwise be transmitted to the mower unit suspension, will now be absorbed in the handle assembly via its brace rod component, thus relieving the suspension means of the necessity of absorbing such impacts, with possible resulting damage to the machine.

Elevational adjustments of the mower unit may be accomplished by alternately raising one side and the other of the mower unit and locking the pertinent adjusting sleeves 41 at each stage. However, in lieu thereof, I prefer to provide a simple elevation adjusting control within reach of an operator which will facilitate such lifting and lowering of the mower unit, in effecting such elevational adjustments.

Such control means involves installation of a winch 67 on the handle shaft in proximity to the crossbar handle and within convenient reach of an operator, such winch being provided with a cable 69 extending over a pulley 71 mounted on the cross member of the bridge and connected by branch cables 73, 75 to the upper ends of the brackets. Such connection of the branch cables to the upper ends of the brackets may conveniently be effected by connecting a crossbar 77 to the upper ends of the brackets and providing such crossbar at each end with an eye hook 79 to which the branch cables may be connected.

The power mower as thus described, may have its brackets, bridge structure and handle assembly formed of lightweight tubular aluminum, along with the blade housing or shroud, whereby the overall weight of the power mower may be held to a very light weight. Such light weight contributes immeasurably to the maneuverability of the mower, and with the crossbar handle, tilting of the mower to facilitate traveling over rugged terrain becomes a relatively simple chore.

By suspending the mower unit between a pair of large diameter wheels, such as bicycle wheels, the providing a reasonably long handle shaft, danger of injury to an operator is very materially minimized.

The overall light weight of the power mower facilitates use thereof on relatively steep slopes, and by substituting for the handle shaft, one of increased length, say of the order of sixteen feet or so, slopes that are almost too steep for a man to walk safely on, may be taken care of by an operator standing safely at the upper end of the slope on horizontal terrain, whereas previously, such slope would have to be cut by hand with a scythe or sickle.

The large diameter bicycle wheels, and particularly when provided with balloon tires, enable the mower to be propelled over ground cover without damage thereto, while the mower unit may be adjusted to either trim the ground cover to a uniform height, or adjusted to cut weeds growing through such ground cover.

The airfoil is capable of being moved backward up against the platform of the housing or shroud by tall weeds being engaged by the mower, to facilitate access thereof to the cutter blade, such weeds while entering the housing, serving to prevent exit of flying stones or other objects engaged by the blade, thus acting as a deflector shield, while the airfoil is thus being turned inwardly and rendered incapable of performing such function.

From the foregoing description of the invention in its preferred form, it will be apparent that the same fulfills all the objects attributed to it, and while the invention has been illustrated and described in its preferred form and in considerable detail, it will be apparent that the same is subject to alteration and modification without departing from the underlying principles involved, and I accordingly do not desire to be limited in my protection to the specific details so illustrated and described, except as may be necessitated by the appended claims.

I claim:

1. A power mower comprising a mower unit, a mobile support for said mower unit, said mobile support including a pair of wheels spaced apart a distance sufficient to receive said mower unit between them, and means for adjustably supporting said mower unit elevationally between said wheels in the vertical plane through the axes of said wheels whereby to maintain said power unit substantially balanced at its various elevational adjustments, said mobile support comprising a bridge coupling said wheels, said bridge including an upright member adjacent one wheel and an upright member adjacent the other wheel, and a cross member connecting said upright members at their upper ends, and said means for adjusting said mower unit as to elevation between said wheels, including means slidably adjustable along said upright members and means suspending said mower unit from said slidable adjustable means.

2. A power mower in accordance with claim 1, characterized by said mower unit including a blade housing, a power unit on said housing, said Power unit having a shaft, and a blade within said housing mounted on the shaft of said power unit, and further characterized by said slidably adjustable means including a sleeve slidably assembled about each of said upright members, and said means for suspending said mower unit from said slidably adjustable means, including a bracket affixed to said housing adjacent one of said upright members, means pivotally coupling said bracket to said slidable sleeve, and a corresponding bracket affixed to said housing adjacent the other of said upright members and similarly related thereto, whereby the mower unit may be adjusted as to elevation above ground.

3. A power mower in accordance with claim 1, characterized by each of said wheels including a hub, and said bridge including a horizontal crossbar member connecting to said upright members at the upper ends thereof, and supported by said wheels at the hubs thereof by an axle adjacent the lower end of each upright member, assembled in the hub of the proximate wheel and permitting angular movement of said bridge about the axis of said wheels, and a handle assembly including a shaft, at one end, symmetrically connected to said bridge crossbar member and a handle bar affixed to said shaft adjacent its other end.

4. A power mower in accordance with claim 3, characterized by means for rigidifying said mower unit, said bridge and said handle assembly into a unit assembly.

5. A power mower in accordance with claim 4, characterized by said rigidifying means including a bar as a component of said handle assemble, connecting at one to said handle shaft and at the other end to a point on said mower unit.

6. A power mower in accordance with claim 5, characterized by the connection of said rigidifying bar to said handle shaft being adjustable whereby to enable adjustment of the height of said handle bar to the convenience of an operator.

7. A power mower in accordance with claim 1, characterized by means within reach of an operator for raising and lowering said mower unit along said upright bridge members.

8. A power mower comprising a mower unit, a mobile support for said mower unit, said mobile support including a pair of wheels spaced apart a distance sufficient to receive said mower unit between them, and means for adjustably supporting said mower unit elevationally between said wheels in the vertical plane through the axes of said wheels, whereby to maintain said power unit substantially balanced at its various elevational adjustments, said mower unit including a blade housing, a power unit on said housing, said power unit having a shaft, and a blade within said housing mounted on the shaft of said power unit, said blade housing including a platform and a fixed apron depending therefrom along a portion of the periphery of said platform, leaving a portion of said periphery facing the front of said power mower free of said fixed apron, and an apron section swingably secured to said free portion of said platform periphery for movement inwardly of said housing to facilitate access of tall weeds into said housing from in front of said power mower during use and impede flight to the outside, of objects from inside said housing due to impact by said blade, when said apron section hangs freely.

9. A power mower in accordance with claim 8 characterized by said apron section being of airfoil design.

* * * * *